United States Patent [19]

Matoba et al.

[11] Patent Number: 4,992,977
[45] Date of Patent: Feb. 12, 1991

[54] CACHE MEMORY DEVICE CONSTITUTING A MEMORY DEVICE USED IN A COMPUTER

[75] Inventors: Tsukasa Matoba, Kawasaki; Takeshi Aikawa, Tokyo; Ken-ichi Maeda, Kamakura; Mitsuo Saito, Yokosuka; Mitsuyoshi Okamura, Tokyo, all of Japan

[73] Assignee: Kabushiki Kaisha Toshiba, Kawasaki, Japan

[21] Appl. No.: 173,296

[22] Filed: Mar. 25, 1988

[30] Foreign Application Priority Data

Mar. 28, 1987 [JP] Japan .................. 64-73000

[51] Int. Cl.[5] .......................... G06F 12/08
[52] U.S. Cl. .................. 364/900; 364/964.22; 364/964.23
[58] Field of Search ... 364/200 MS File, 900 MS File

[56] References Cited

U.S. PATENT DOCUMENTS

| | | | |
|---|---|---|---|
| 4,445,174 | 4/1984 | Fletcher | 364/200 |
| 4,481,573 | 11/1984 | Fukunaga et al. | 364/200 |
| 4,802,085 | 1/1989 | Levy et al. | 364/200 |
| 4,807,110 | 2/1989 | Pomerene et al. | 364/200 |

FOREIGN PATENT DOCUMENTS 0144249 6/1985 European Pat. Off.
0156307 10/1985 European Pat. Off.

OTHER PUBLICATIONS

Electronics International, vol. 55, No. 16, Aug. 1982, pp. 112-117, New York, U.S.: P. Knudsen: "Supermini Goes Multiprocessor Route To Put It Up Front In Performance".

Primary Examiner—Thomas M. Heckler
Attorney, Agent, or Firm—Oblon, Spivak, McClelland, Maier & Neustadt

[57] ABSTRACT

A cache memory device comprises a data cache memory, an instruction cache memory, an instruction code area change detector, and an instruction code change processor. The instruction code area change detector decides whether writing access to the data cache memory by the processor is to a data area or to an instruction area of a main memory. The instruction code change processor passes the data cache memory to perform direct writing into the main memory when the writing access is to the instruction area, and, when data for a processor address is cached in a tag section of the instruction cache memory, invalidates the effective flag of the tag section.

11 Claims, 3 Drawing Sheets

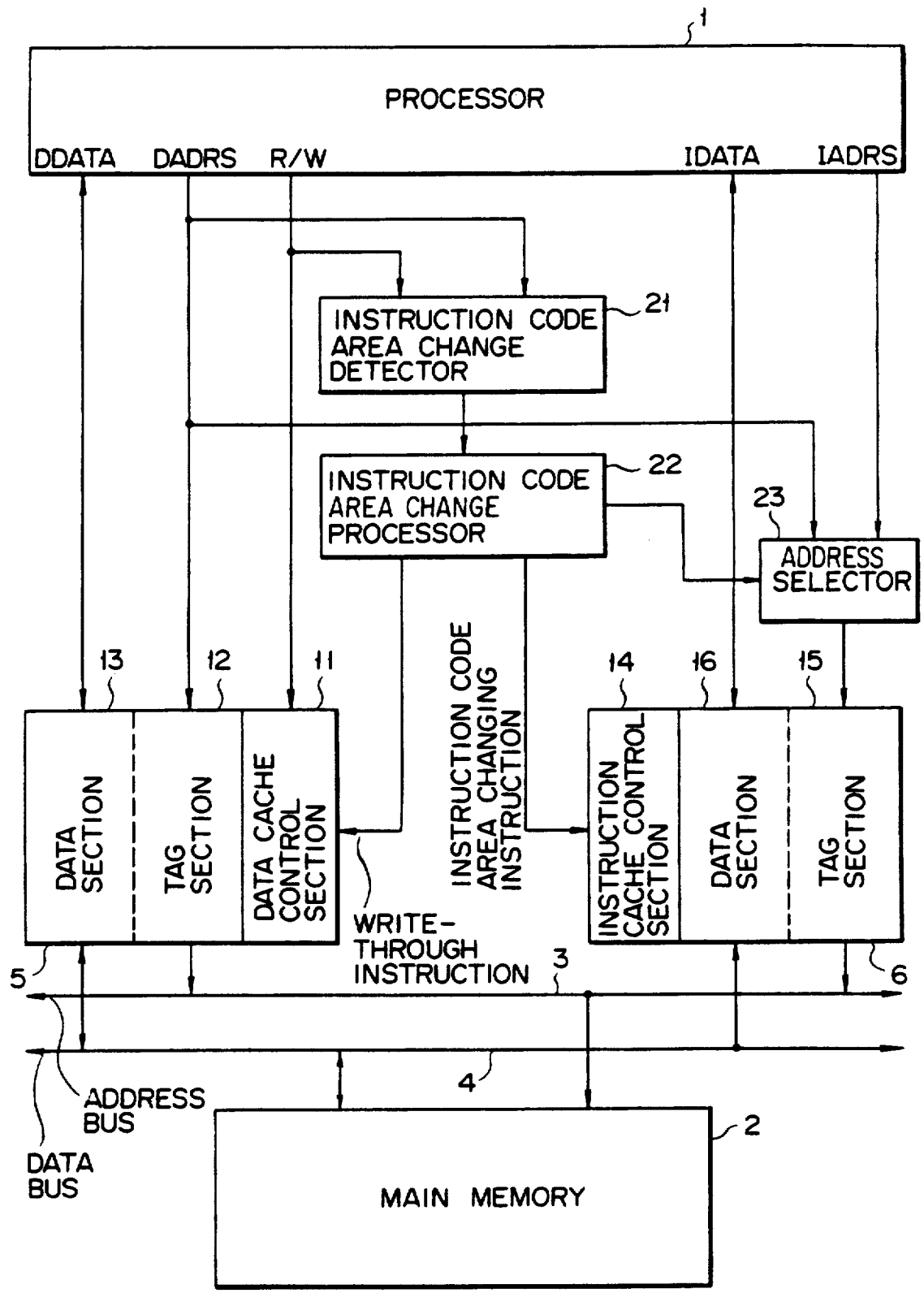
F I G. 1

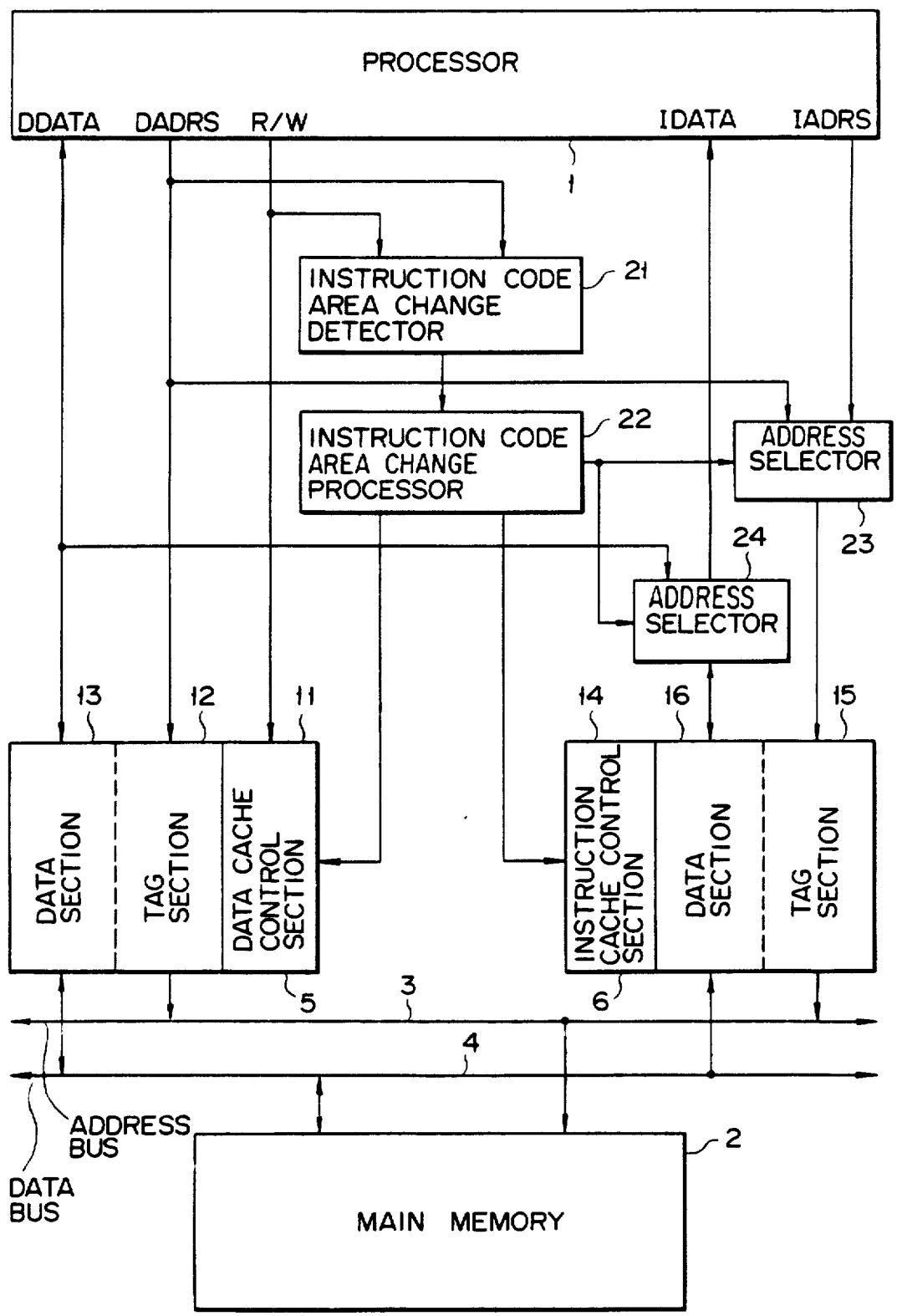
F I G. 5

CACHE MEMORY DEVICE CONSTITUTING A MEMORY DEVICE USED IN A COMPUTER

BACKGROUND OF THE INVENTION

1. Field of the Invention

This invention relates to a cache memory device having two separate cache memories for data and instructions, and more particularly to a cache memory device for executing high-speed access while keeping consistency in self-correcting codes.

2. Description of the Related Art

It is desired that memory devices used in a computer be of fast and large capacity type. Since a fast memory device is generally expensive it is economically difficult to construct all the memory devices by means of fast-type memory devices only. Therefore, in general, a large capacity, inexpensive memory device and a small capacity, fast memory device are combined to equivalently realize a fast, large capacity memory. In this case, the small capacity, fast memory device is called "cache memory" (buffer storage).

The cache memory is disposed between a processor and a large-capacity main memory. The cache memory is adapted for temporarily storing data and/or instruction codes which are frequently transferred between the processor and the main memory. If data and/or instruction codes the processor is going to access are in the cache memory, then the processor accesses the cache memory in lieu of the main memory. This is called "cache hit". Namely, by storing data and/or instruction codes having high access frequency in the cache memory high-speed access can be achieved.

The structure of cache memory is divided into the following two types. The first type includes only one cache memory which buffers both data and instruction codes the processor handles. The second type includes two separate cache memories, one for storing data and the other for storing instruction codes. Having limited capacity, the cache memory is updated as needed so that data and/or instruction codes having higher access frequency are always stored therein.

As in the case of the second type, when the cache memory is divided into a data cache memory and an instruction cache memory mutual interference can be avoided which might occur between data and program in the algorithm for refreshing the contents of the cache memory. In other words, the contents of each of the data cache memory and the program cache memory (which is also referred to as "instruction cache") can be optimized. Further, where the processor has separate data-access and instruction-fetch ports, they can be used simultaneously and in parallel with each other.

However, disadvantages will also arise from the division of the cache memory into the data cache and the instruction cache. That is, in the case of operation in which the program changes itself while running, or in the case of so-called self-changing code, the consistency in data, or instruction codes, or processing will be lost between both the cache memories, and between each cache memory and the main memory. In other words, the operation for the program to rewrite itself is an operation intended for the data cache memory in which the program is handled as if it is data. On the other hand, the operation for the processor to execute the rewriting of program is an operation applied to the instruction cache memory in which instructions are fetched from the instruction cache memory. Namely, until an instruction written into the data cache memory is returned (write back) to the main memory, a content fetched from the main memory when the instruction is executed is not subjected to any change. It is also true of the case where the instruction has been entered into the cache memory before the content is changed. Conventionally, to avoid such a problem, a program to be subjected to the self-change is not entered into the cache memory but entered into the main memory. Naturally, in this case, the advantage of the cache-memory's capability of high-speed processing cannot be expected so that the execution of program is lowered in speed. However, the self-changing program is often used primarily for making the operation of the program itself fast. Thus, the fact that a cache memory cannot be used for storing the self-changing program results in a great disadvantage. To obviate this, large hardware generally called a bus watch is required to always monitor the access conditions.

Typical artificial intelligence languages such as Prolog and Lisp operate in their execution processes as if they executed programs while producing them. Thus, the technique of the self-changing program is essential to these languages.

For this reason, a cache memory device is desired which has a data cache memory and an instruction cache memory independently, and can keep consistency between the cache memories and between each cache memory and main memory with respect to a self-changing program as well.

As described above, with the conventional cache memory device of data cache and instruction cache separation type, problems arise in which the consistency in the execution of the self-changing code cannot be held, the self-changing code cannot cached, or large hardware is required to monitor the caches.

SUMMARY OF THE INVENTION

It is accordingly an object of this invention to provide a cache memory device which enables the consistency in the execution of a self-changing program to be held without adversely affecting the cache effect and necessitating a substantial increase in hardware.

To achieve the above object, a cache memory device of this invention comprises instruction cache memory means coupled to a processor of a computer and a main memory having a data area and a instruction code area, for storing instructions the processor executes; data cache memory means coupled to the processor and the main memory for storing data; instruction-code-area change detecting means for detecting that the processor has performed writing into the instruction code area of the main memory; and instruction code area change processing means coupled to the instruction code area change detecting means, the instruction cache memory means, and the data cache memory means, for controlling the data cache memory so as to change writing into the data cache memory to direct writing from the processor to the main memory when the instruction code area change detecting means detects that an instruction code is written into the instruction code area of the main memory from the data cache memory means, and for applying to the instruction cache memory a signal for invalidating the instruction code when the content of the instruction code written into the instruction code area is stored in the instruction cache memory after the writing is changed to the direct writing to the main memory.

According to the cache memory device as described above, even when an instruction code is changed by the processor, the consistency in data and/or instruction code processing can be held between the data cache memory, the instruction cache memory and the main memory during the execution of the changed instruction. That is, when a program is changed, it is only required to directly access the main memory, invalidate the instruction cache memory, or correctly rewrite data. After the program is changed high-speed processing can be achieved as in the case of a normal cacheable program.

BRIEF DESCRIPTION OF THE DRAWINGS

FIG. 1 is a block diagram of a cache memory device embodying this invention;

FIG. 5 is a block diagram of a cache memory device according to another embodiment of this invention.

DETAILED DESCRIPTION OF THE PREFERRED EMBODIMENTS

Figure 2A:
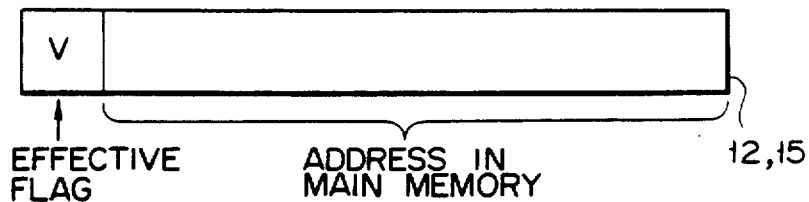
FIGS. 2A and 2B show cache memories having tag sections containing different contents.

Referring now to FIG. 1, processor 1 and main memory 2 are interconnected via address bus 3 and data bus 4 with data cache memory 5 and instruction cache memory 6 disposed between processor 1 and buses 3 and 4.

Data cache memory 5 comprises data cache memory control section 11, tag section 12, and data section 13. More specifically, data cache memory control section 11 is adapted for performing a memory control operation in response to a read/write (R/W) control signal and a write-through instruction signal from processor 1. Tag section 12 holds data address (DADRS) from processor 1. Data section 13 stores data (DDATA) corresponding to the data address from processor 1. Similarly, instruction cache memory 6 comprises instruction cache memory control section 14, tag section 15, and data section 16. More specifically, instruction cache memory control section 14 performs a memory control operation in response to an instruction code area changing instruction signal supplied from processor 1 via instruction code area changing detector section 21 and code changing processing section 22. Tag section 15 holds an instruction address (IADRS) supplied from processor 1 via address selector 23. Data section 16 holds instruction data (IDATA) corresponding to the instruction address from processor 1.

The DADRS signal and R/W signal are applied from processor 1 to instruction-code-area change detecting section 21 which produces a self-changing code detecting signal when processor 1 detects writing into the instruction code area. Instruction-code change processing section 22 is responsive to the self-changing code detecting signal to produce a write-through instruction, instruction-code changing instruction, and data cache address select signal. The data cache address select signal is applied to instruction-cache-address selector 23 as a switching signal. Address 23 causes, when the self-changing code is detected, instruction cache memory 6 to be accessed by the DADRS signal so as to confirm whether the corresponding address code is stored therein.

Tag sections 12 and 15 of data and instruction cache memories 5 and 6 each include a flag (V) as well as an address as shown in FIG. 2A. V = 1 represents that data sections 13 and 16 are valid, while V = 0 represents that they are invalid.

If the address fields of tag sections 12 and 15 of cache memories 5 and 6 referred to by the lower bits of address data from processor 1 coincide with upper bits of the processor address, and the flag V is 1, then it is handled as cache hit, and data section 13 and 15 corresponding to the tag are accessed. On the other hand, if no coincidence occurs between the address field of the same tag section and the upper bits of the processor address, or V = 0, or both cases occur, then it is regarded as cache error. Consequently, the correct data is read from main memory 2 to data sections of cache memories 5 and 6, and the correct upper address is loaded into tag sections 12 and 15, and the flag is set at V = 1.

Subsequently, processor 1 begins again access to the cache memories.

Processor 1 normally fetches an instruction to be executed from instruction cache memory 6, and, when executing the instruction, accesses data cache memory 5. In main memory 2 an instruction code area and a data area are definitely separated. Thus, in most cases, writing data into the instruction area is not allowed. However, as the technique for making the program execution fast there is a technique using so-called self-changing code for advancing the program execution while the program changes itself. Further, in the recently noticed artificial intelligence languages such as Prolog and Lisp, it is well known that changes in program regions occur frequently in the execution process thereof. In the system using separate cache memories for data and instructions, processor 1 rewrites the program from data cache memory 5, and fetches the program from instruction cache memory 6. Thus, a problem arises in which the consistency of the self-changing code cannot be held between cache memories 5, 6 and main memory 2. In other words, even if data memory 5 is changed by the self-changing code it is not reflected on instruction cache memory 6.

In the cache memory device of this invention, therefore, in order to decide whether a write access of processor 1 to data cache memory 5 is for the data area or for the instruction area of main memory 2 there is provided instruction code area change detector 21. Further, there is provided instruction code change processor 22 which is adapted for, when the write access of processor 1 is to the instruction code area, writing directly into main memory 2 passing data cache memory 5 (so-called write-through), examining tag section 15 of instruction cache memory 6, and setting the effective flag of the tag at 0 when data for the processor address is cached.

Instruction code area change detector 21 is formed of a table representing an arrangement of the instruction code area and the data area in main memory 2, for example.

Figure 3:
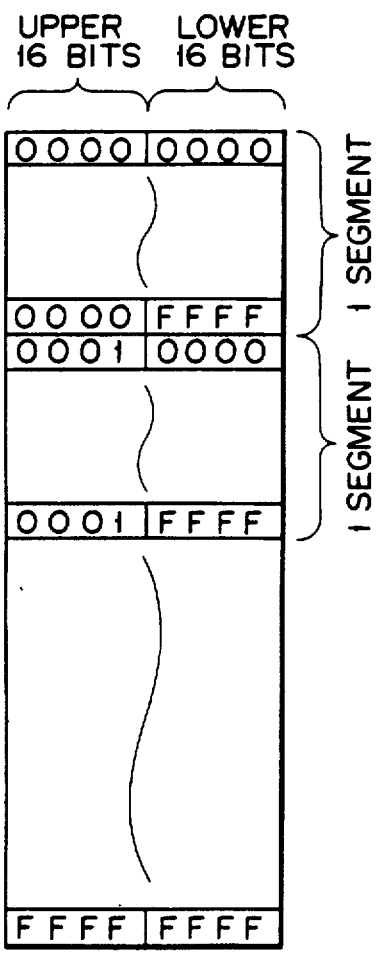
FIG. 3 is a diagram for explaining divided areas of the main memory in FIG. 1.
Figure 4:
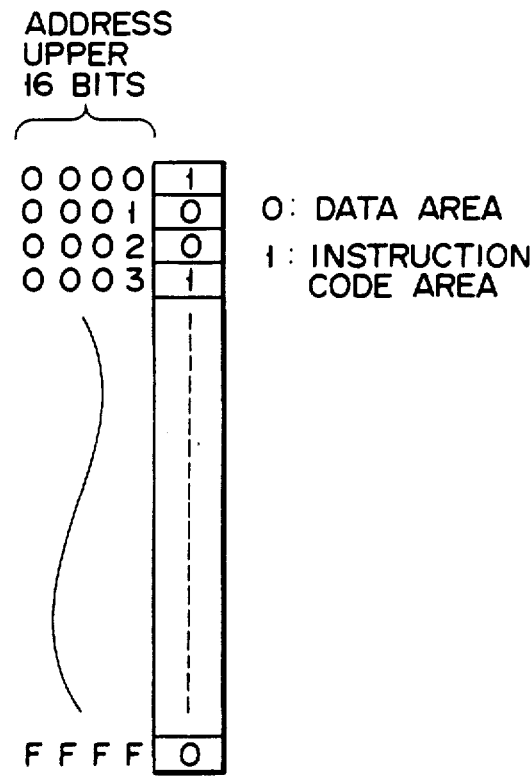
FIG. 4 shows, by way of example, a table of the code-area changing section in FIG. 1.

Suppose that the address of processor 1 is formed of 32 bits as shown in FIG. 3. Where the lower 16-bit addresses are grouped into one segment (64K byte unit), and the one segment unit defines the instruction code area and data area, instruction code area change detector 21 has 64K (64K bits) tables corresponding to the upper 16 bits of addresses, and sets 0 or 1 as its content. When the content is 0, 64K byte (1 segment) areas, which are common in the upper 16 bit address, are the data area. When the content is 1, on the other hand, the areas are the instruction code area. The table is updated each time the condition of main memory 2 is changed.

Instruction code area change detector 21 is responsive to the upper 16 bits in the address from processor 1 to refer to the table. If the content is 1, and the R/w signal from processor 1 is write, then detector 21 regards this processor cycle as a self-changing cycle to apply a self-changing code detect signal to instruction code changing processor 22.

Instruction code changing processor 22 is responsive to the self-changing code detect signal to perform the following two processes. As the first process, instruction code changing processor 22 applies a write-through instruction signal to data cache memory 5. As a result, data cache control section 11 passes accessed data and writes the data into main memory 2 directly. At this time the contents of tag section 12 and data section 13 of data cache memory 5 remain unchanged.

The second process is as follows. Instruction code changing processor 22 outputs an instruction code changing instruction to instruction cache control section 14 of instruction cache memory 6, and a data cache address select signal to address selector 23. As a result, instruction cache control section 14 checks whether the data of the changed program address is cached in instruction cache memory 6. When the data is cached, the effective bit of the tag section 15 is made 0. As a result, the cached data is made invalid. When processor 1 next fetches the address data an error hit is caused, thereby accessing main memory 2 for correct data. Thus, the consistency is held in changing the instruction code.

This invention is not limited to the above embodiment. For example, as shown in FIG. 5, a data selector 24 may be added to the above embodiment. In this case, when a changed old instruction code is cached in instruction cache memory 6, instruction code changing processor 22 issues a data select signal to address selector 24 so that new data to data cache memory 5 from processor 1 is also applied to instruction cache memory 6, replacing the cached old data with the new data. At this time the effective flag bit (V) is set at 1. Thus, when the changed program is next fetched by processor 1 correct content is read out without causing error hit.

Figure 2B:
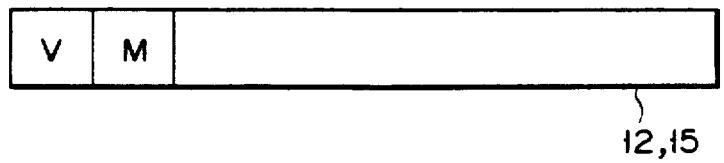

At this time, tag section 15 of instruction cache memory 6 may be additionally provided with a change flag M representing that data has been changed, as shown in FIG. 2B. This change flag M has an instruction-cache write back function of writing data A back to the address of main memory 2 corresponding to data A only when the data A in changing condition is replaced with other data B. Owing to the provision of such a function, data cache memory needs not operate in rewriting a instruction section.

What is claimed is:
1. A cache memory device comprising:
a processor;
a main memory having an instruction code area and a data area;
data cache memory means connected to and located between said processor and said main memory;
instruction cache memory means connected to and located between said processor and said main memory;
instruction code area change detector means for determining the area in the main memory where an instruction code from said processor is to be sent;
instruction code area change processor means, connected to said instruction code area change detector means and said data cache memory means, for sending, when said instruction code is intended for said instruction code area of said main memory, said instruction code directly to said instruction code area of said main memory;
said instruction code area change processor means having means for outputting an instruction code changing instruction to said instruction cache memory means; and
wherein said instruction code area change detector means and said processor means are located between said processor and said data cache memory means and said instruction cache memory means.

2. A cache memory device according to claim 1, further comprising:
address selector means connected between said instruction code area change processor means and said instruction cache memory means, and connected to said processor, for receiving a data cache address signal from said instruction code area change processor means.

3. A cache memory device according to claim 2 wherein:
said data cache memory means and said instruction cache memory means each have a tag section and a data section, the tag section of said instruction cache memory including an effective flag bit, and said instruction code area change processor means changes the effective flag bit from 1 to 0 bit when invalidating the content of data stored in said instruction cache memory means.

4. A cache memory device according to claim 3, wherein the tag section of said instruction cache memory means further includes a change flag representing that the data has been rewritten, said instruction code area change processor means has an instruction cache write back function for writing data whose change flag is active back to an address corresponding to the data in said main memory only when the data whose change flag is active is replaced with other data.

5. A device according to claim 3, further comprising:
a data selector connected between said processor and said instruction cache memory means and connected to said instruction code area change processor means, said data selector sending and receiving data to and from said data section of said instruction cache memory means, and also sending and receiving write data to and from said processor thereby to send a signal for instruction data to said processor, and said data selector receiving a data select signal from said instruction code area change processor means when a changed old instruction code is cached in said instruction cache memory means to replace the old instruction code with new data supplied from said processor.

6. A cache memory device according to claim 1, wherein said instruction code area change detector means is formed of a table representing an arrangement of the instruction code area and the data area of said main memory.

7. A device according to claim 6, wherein said data cache memory means has a tag section which has means for holding a data address sent from said processor.

8. A cache memory device according to claim 1, wherein:
   said data cache memory means and said instruction cache memory means each have a tag section and a data section, the tag section of said instruction cache memory including an effective flag bit, and said instruction code area change processing means changes the effective flag bit from 1 to 0 bit when invalidating the content of data stored in said instruction cache memory means.

9. A cache memory device according to claim 8, wherein the tag section of said instruction cache memory means further includes a change flag representing that the data has been rewritten, said instruction code area change processing means has an instruction cache write back function for writing data whose change flag is active back to an address corresponding to data in said main memory only when the data whose change flag is active is replaced with other data.

10. A device according to claim 1, wherein said data cache memory means comprises a data cache memory control section, a tag section and a data section.

11. A device according to claim 1, wherein:
    said data cache memory means has a data cache control section which has means for performing a memory control operation in response to a read/write control signal and a write-through instruction signal from said processor.

* * * * *

UNITED STATES PATENT AND TRADEMARK OFFICE
CERTIFICATE OF CORRECTION

PATENT NO. : 4,992,977

DATED : February 12, 1991

INVENTOR(S) : Tsukasa Matoba et al.

It is certified that error appears in the above-identified patent and that said Letters Patent is hereby corrected as shown below:

ON THE TITLE PAGE:

The Foreign Application Priority data is incorrect, should be, --Mar. 28, 1987 [JP]  Japan ................62-73000--.

Signed and Sealed this

Twenty-fourth Day of November, 1992

Attest:

DOUGLAS B. COMER

*Attesting Officer*  *Acting Commissioner of Patents and Trademarks*